No. 610,132. Patented Aug. 30, 1898.
J. F. GOODRIDGE.
ADJUSTABLE HANDLE BAR FOR BICYCLES.
(Application filed Oct. 28, 1897.)

(No Model.)

WITNESSES.
B. L. Marden
L. L. Kelley

INVENTOR.
James F. Goodridge
by Teschemacher
Atty.

United States Patent Office.

JAMES F. GOODRIDGE, OF BOSTON, MASSACHUSETTS.

ADJUSTABLE HANDLE-BAR FOR BICYCLES.

SPECIFICATION forming part of Letters Patent No. 610,132, dated August 30, 1898.

Application filed October 28, 1897. Serial No. 656,705. (No model.)

*To all whom it may concern:*

Be it known that I, JAMES F. GOODRIDGE, a citizen of the United States, residing at Boston, in the county of Suffolk and State of Massachusetts, have invented certain new and useful Improvements in Adjustable Handle-Bars for Bicycles, of which the following is a specification.

My invention relates particularly to the construction shown in my earlier application, Serial No. 603,898, filed August 25, 1896, and allowed September 7, 1897.

The objects of this invention are to provide for the protection of the teeth on the handle-bar against injury by the locking-cam or other device, so that the teeth may be made as long as the socket which receives the handle-bar, and also to provide an improved cam which will engage two sides or faces of a collar on the handle-bar, so as to lock the handle-bar against vibration and endwise movement. I accomplish these objects by the mechanism illustrated in the accompanying drawings, in which—

Figure 1:
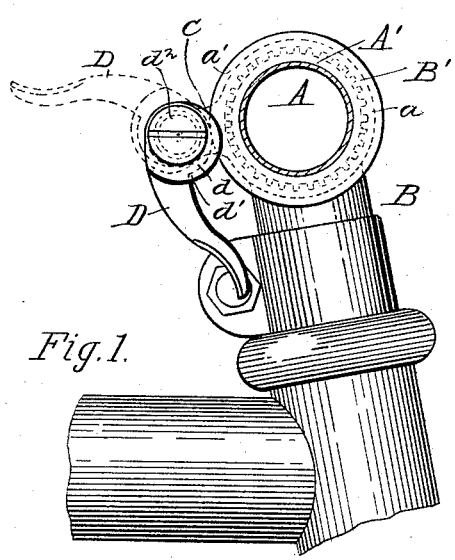
Figure 2:
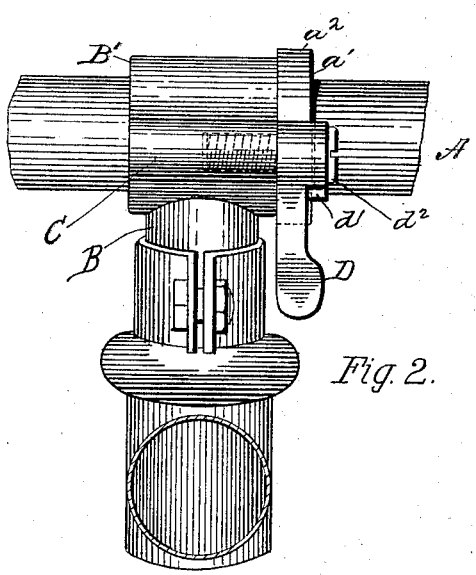
Figure 3:
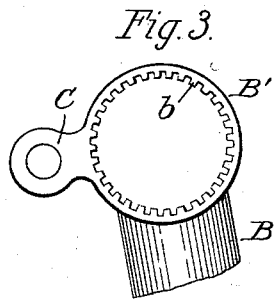
Figure 4:
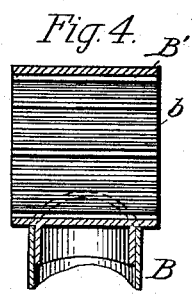
Figure 5:
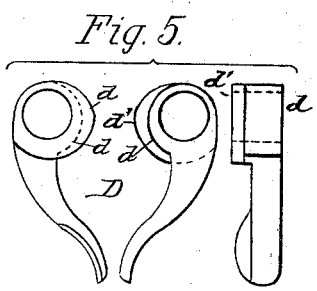
Figure 6:
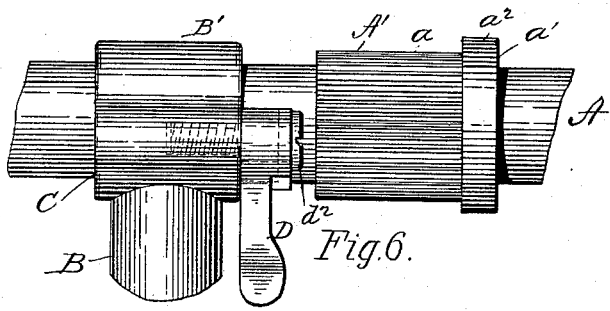

Figure 1 is a side elevation of a portion of the steering-head of a bicycle with my improvements applied thereto, the handle-bar being shown in section. Fig. 2 is a rear elevation of the parts shown in Fig. 1. Figs. 3 and 4 are detail views of the steering-post socket. Fig. 5 shows the locking-cam in several positions. Fig. 6 is a view similar to Fig. 2, but with the handle-bar teeth disengaged from the toothed socket.

A is the handle-bar, to the middle of which is brazed a cylindrical sleeve A', having parallel longitudinal teeth $a$, and at one end of this sleeve or series of teeth is placed or formed a collar $a'$ of greater thickness than the sleeve and forming a stop-shoulder.

B is the steering-post, having at its upper end an unbroken or non-split handle-bar socket B', the interior of which is provided with parallel longitudinal teeth $b$, which extend from end to end of the socket and with which the handle-bar teeth $a$ are adapted to interlock when the handle-bar is moved longitudinally from the position shown in Fig. 6 to that shown in Fig. 2, in which latter position the shoulder or collar $a'$ abuts against the socket B'.

The socket B' is formed, preferably, on its rear side with a longitudinal rib or enlargement C, having a screw-threaded bore in its end next to the collar $a'$, and into this bore is screwed the threaded end of a shouldered screw $d^2$, on which pivots the cam-locking lever D. This lever D is provided with a cam or eccentric surface $d$ at its pivoted end and with a flange $d'$ on one side of the cam and projecting therebeyond. Thus when the handle-bar has been pulled out, as in Fig. 6, and adjusted by rotating it and then sliding its teeth $a$ back into the socket B' the cam-lever may be swung from its dotted position, Fig. 1, down to its locking position. In this locking position the cam-surface $d$ will bear firmly on the outer face $a^2$ of the collar $a'$ and bind the handle-bar against rattling, while the lip or flange $d'$ will extend over the outer side face of the collar like a latch and lock the handle-bar against endwise movement even if the cam-lever should not be pushed down hard upon the face $a^2$ of the collar $a'$.

The cam or eccentric $d$ is of such increasing radius at its lower part that in case that face or the face $a^2$ of the collar or shoulder $a'$ should become worn it will only be necessary to push the lever down a little further to cause a firm engagement.

I wish to call especial attention to the fact that the collar or shoulder $a'$ is of greater diameter than the socket B' and that the shape and proportions of the cam-lever are such as to render it impossible to bring the cam-lever down upon the teeth $a$ of the sleeve A', even though the lever should be thrown down to its locking position before the teeth $a$ have fully entered the socket B'. This is an important matter, as the teeth $a$ are necessarily fine to provide for close adjustment and are easily marred, in which event they will not enter the socket B'. By enlarging the collar $a'$ the locking portion of the cam may be made so short that it will not project at any time into or across the bore of the socket B', and hence will never cross the path of the teeth $a$.

In my former construction the handle-bar teeth only extended half the length of their sleeve, and thus mutilation by the cam was avoided; but in the present construction the teeth $a$ extend the full length of the sleeve $A'$ and the teeth $b$ extend the full length of the socket, and thereby a stronger joint is afforded.

What I claim as my invention, and desire to secure by Letters Patent, is—

1. The combination with the internally-toothed socket on the steering-post and the longitudinally-movable, axially-adjustable handle-bar passed through said socket and having external teeth interlocking with those in the socket, of a locking-lever or eccentric pivoted on one end of the socket and adapted to engage the handle-bar, substantially as described.

2. The combination with the internally-toothed socket on the steering-post, and the longitudinally-movable, axially-adjustable handle-bar having external teeth at its middle interlocking with those in the socket, and a stop shoulder or collar at one end of the handle-bar teeth, of a lever pivoted on one end of the socket and having a cam or eccentric surface to engage the handle-bar, substantially as described.

3. The combination with the socket on the steering-post and the axially-adjustable handle-bar passed therethrough and having a sliding interlocking engagement with the interior thereof: said handle-bar being provided with a stop collar or shoulder abutting against one end of the socket, of a locking-lever having a cam-surface to engage the outer face or periphery of said collar or shoulder and a flange or lip to engage the outer side face of the shoulder, substantially as described.

4. The combination with the socket on the steering-post having internal longitudinal teeth extending from end to end, and the longitudinally-movable, axially-adjustable, handle-bar passed through said socket and having external teeth corresponding to and interlocking with those in the socket, and also having a stop collar or shoulder, of a locking device mounted on one end of the socket, and movable inwardly far enough to engage the said collar or shoulder but insufficiently to engage the teeth on the handle-bar, substantially as described.

5. The combination with the internally-toothed socket and the longitudinally-movable, axially-adjustable handle-bar toothed to correspond with said socket and provided with a stop collar or shoulder of greater diameter than the said socket, of a lever pivoted to one end of the socket and having a cam or eccentric face to engage the outer face of the said collar or shoulder and a flange or lip to engage the outer side face of said shoulder; said cam-surface and flange being insufficient in width to cross or intersect the bore of the socket, substantially as described.

Witness my hand this 27th day of October, A. D. 1897.

JAMES F. GOODRIDGE.

In presence of—
P. E. TESCHEMACHER,
LOUISE A. CHACE.